(12) United States Patent
Rolle et al.

(10) Patent No.: US 11,550,781 B2
(45) Date of Patent: Jan. 10, 2023

(54) IDENTIFICATION OF DATA IN DISTRIBUTED ENVIRONMENTS

(71) Applicant: SAP SE, Walldorf (DE)

(72) Inventors: Benny Rolle, Karlsruhe (DE); Matthias Vogel, Saarbrücken (DE); Stefan Hesse, Dresden (DE)

(73) Assignee: SAP SE, Walldorf (DE)

( * ) Notice: Subject to any disclaimer, the term of this patent is extended or adjusted under 35 U.S.C. 154(b) by 235 days.

(21) Appl. No.: 16/995,175

(22) Filed: Aug. 17, 2020

(65) Prior Publication Data

US 2022/0050834 A1 Feb. 17, 2022

(51) Int. Cl.
*G06F 7/00* (2006.01)
*G06F 16/242* (2019.01)
*G06F 16/248* (2019.01)

(52) U.S. Cl.
CPC ........ *G06F 16/2425* (2019.01); *G06F 16/248* (2019.01)

(58) Field of Classification Search
CPC ............... G06F 16/2425; G06F 16/248; G06F 16/24578; G06F 16/9535; G06F 3/04842; G06F 3/0482; H04L 67/63; H04L 67/561; H04L 45/745; H04L 45/306; H04L 61/5007; H04L 61/457; H04L 61/4511
See application file for complete search history.

(56) References Cited

U.S. PATENT DOCUMENTS

| | | | |
|---|---|---|---|
| 11,196,665 B1 * | 12/2021 | Pereira | H04L 67/63 |
| 2018/0300369 A1 * | 10/2018 | Svec | G06F 16/24544 |
| 2020/0241865 A1 * | 7/2020 | Phong | G06F 8/71 |

* cited by examiner

*Primary Examiner* — Mohammad A Sana
(74) *Attorney, Agent, or Firm* — Buckley, Maschoff & Talwalkar LLC (57) ABSTRACT

Systems and methods include requesting, from a first application system, of a first one or more combinations of search parameters for identifying a data subject identifier of the first application system, transmission of a first query to the first application system including values of search parameters of a first one of the first one or more combinations of search parameters, the values associated with a first data subject, reception of a first data subject identifier of the first application system in response to the first query, transmission of a second query to the first application system including the first data subject identifier, and reception of data of the first application system associated with the first data subject identifier in response to the second query.

17 Claims, 10 Drawing Sheets

Data Manager

Search Parameters

- First name
- Last Name
- Street Address
- City
- E-mail Address
- Telephone Number

[Find Data Subject] 810

IDENTIFICATION OF DATA IN DISTRIBUTED ENVIRONMENTS

BACKGROUND

Conventional software applications store data for use during operation thereof. The data often includes details associated with natural persons, including but not limited to names, addresses, telephone numbers, transactional data and other potentially-identifying data. Such data is increasingly subjected to various data privacy regimes. Entities providing the software applications must therefore ensure that their software applications and the storage of any data thereby are compliant with applicable laws. For example, certain laws require on-demand production of "personal" data based on a request received from any given data subject.

Modern distributed computing environments typically consist of several independent or semi-independent application systems, each of which maintains its own unique data schema. The disparate data schemas may represent unique data subjects in different ways. Moreover, several different types of databases may be used to store data according to the data schemas, such as graph databases, relational data bases, key-value-stores, and blockchain-based systems. Accordingly, it is technically challenging to identify all data stored in all application systems with respect to a given data subject.

Some conventional systems attempt to address the foregoing by requiring participating application systems to identify data subjects in response to queries which include certain predefined combinations of search parameters. These combinations of search parameters may include, for example: first name, last name and date of birth; first name, last name and e-mail address; and a technical ID defined by the application system. However, these predefined combinations are not necessarily efficient (or even usable) to identify a data subject across all application systems. Moreover, such conventional systems do not facilitate collection of personal data across different application systems.

Systems for improving identification of personal data associated with a data subject across disparate application systems are desired.

DETAILED DESCRIPTION

The following description is provided to enable any person in the art to make and use the described embodiments. Various modifications, however, will remain readily-apparent to those in the art.

Some embodiments facilitate acquisition of all personal data of a given data subject processed by various heterogenous application systems in a given landscape. An application system as described herein comprises a computing environment configured to provide functionality to a user. Examples of application systems include a Web store, a Short Message Service system, a Customer Relationship Management system, and a banking system. One or more application systems in the following examples may be a distributed cloud application.

Embodiments may provide an integrated approach for querying multiple application systems at once to find personal data in a generic and iterative way. Application systems according to some embodiments provide, in response to a query, combinations of search parameters that can be used to identify a data subject within the respective application systems. The combinations of search parameters may differ among each application system, and some search parameters may be common among two or more combinations of search parameters. Moreover, the iterative process described below may assist in identifying a data subject among multiple initial hits returned by an application system, in using personal data returned from a first application system to query a second application system for personal data, and/or in further verifying an identity of a data subject.

Although embodiments are described below with respect to personal data, any other data associated with a particular data subject may be acquired using some embodiments. In this regard, embodiments may operate to facilitate identification of a same data subject in the data of disparate application systems, and may then acquire any desired data associated with the data subject within the application systems.

Figure 1:
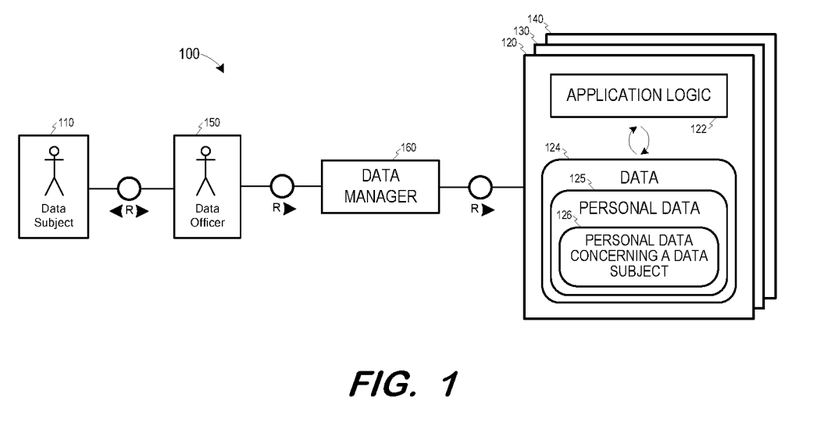
FIG. 1 is a block diagram of a system architecture according to some embodiments.

FIG. 1 illustrates system 100 according to some embodiments. System 100 operates in conjunction with data subject 110 for whom personal data is being requested. Data subject 110 will be described herein as a natural person but embodiments are not limited thereto. Data subject 110 may comprise a company, a department or any other entity which may be represented as a unique logical entity within each of application systems 120, 130 and 140.

Application systems 120, 130 and 140 execute application logic (e.g., application logic 122 of application system 120) to provide functionality to users. The functionality of application logic 122 is provided based on data 124 which is stored and managed thereby. Data 124 may therefore include any data which is used and/or generated during operation of application system 120. It should be noted that a single computing system may operate multiple different applications, with each application managing corresponding stored data. The data corresponding to an application may be dedicated to that application or shared, in whole or in part, by two or more applications.

As shown and described in more detail below, data 124 includes, among other data, personal data 125. Personal data 125 may comprise any data deemed as "personal" as it relates to data subjects. Non-exhaustive examples of personal data include name, date of birth, government-issued identification number, passport number, street address, telephone number, income, transactional data (e.g., sales orders), etc. Generally, any data that can be associated with a data subject can be considered personal data. The particular personal data 125 associated with application logic 122 depends upon the functionality provided by application logic 122

Personal data 125 therefore includes many subsets of personal data 126, each of which concern a particular unique data subject. According to some embodiments, some personal data 125 might be associated with more than one data subject. Once the identity of a data subject (e.g., a customer ID) as represented within an application system 120, 130 or 140 is known, the application system may execute a simple query to acquire and return the personal data 126 associated therewith.

The data associated with any of applications 120, 130 and 140 may comprise one or more of conventional tabular data, row-based data, column-based data, and object-based data. The data may be stored in an in-memory or disk-based database, for example, and may be stored in a cloud-based database system remote from associated application logic.

Each of application systems 120, 130 and 140 may comprise any combination of computing hardware and software for providing application functionality to users. Any components of application systems 120, 130 and 140 may be distributed and-or cloud based. Embodiments are not limited to any particular implementation, except as provided herein, of application systems 120, 130 and 140.

Data officer 150 of FIG. 1 may comprise one or more individuals designated to receive requests for personal data from data subjects and to fulfill those requests. Data officer 150 receives a request for personal data from data subject 110 along with identifying information of data subject 110. The request for personal data may conform to a commonly-used and machine-readable format. Data officer 150 may initiate fulfillment of the request by first verifying the identifying information provided by data subject 110 and then sending a request for associated personal data to data manager 160. As will be described in detail below, data officer 150 may execute several interactions with data manager 160, and potentially also with data subject 110, to acquire and return to data subject 110 all personal data 126 of application systems 120, 130 and 140 which is associated with data subject 110.

In response to the initial request from data officer 150, data manager 160 queries each of application systems 120, 130 and 140 for combinations of search parameters that can be used to identify a data subject within the respective application systems. The combinations of search parameters may differ among each application system, and some search parameters may be common among two or more combinations of search parameters.

Data manager 160 presents the combinations of search parameters to data officer 150. In turn, data officer 150 asks data subject 110 to provide values for each parameter of at least one of the combinations of search parameters. Data officer 150 forwards these values to data manager 160, which queries a corresponding one or more of application systems 120, 130 and 140 with the parameter values.

Data manager 160 receives results from the queried one or more of application systems 120, 130 and 140. The results may provide data concerning one or more data subjects per queried application system. The results received from one application system may be used to complete a combination of search parameter values of a second application system and query the second application system based thereon. Accordingly, querying of the application systems may proceed iteratively until a data subject is identified within each application system.

In some embodiments, the iterative process may include additional requests for data from data subject 110. For example, based on information initially returned from an application system (e.g., a birthplace), data officer 150 may query data subject 110 for this information to further confirm the identity thereof. In other examples, the parameter combinations provided by an application are not uniquely identifying of a data subject, and the initially-returned data might include records associated with different data subjects. In such a case data officer 150 may query data subject 110 using the information of the records in order to determine which record is associated with data subject 110. For example, if the parameters include name and date of birth, the returned information may include records of two data subjects having the same name and date of birth. Data officer 150 may therefore query data subject 110 for his/her city of residence to choose which of the returned records is the correct one.

Once data subject 110 is identified in each of application systems 120, 130 and 140 (e.g., by means of system-specific identifiers), data manager 160 queries application systems 120, 130 and 140 for all the personal data associated with identified data subject 110. Each of application systems 120, 130 and 140 is responsible for implementing processes to retrieve and return only personal data 126 concerning identified data subject 110 and no personal data 126 concerning another data subject. In some examples, an application system finds all personal data that is associated with the identified data subject and then removes from the identified data (automatically and/or with assistance of a domain expert) such data whose inclusion would violates a right and/or freedom of other data subjects or other parties. Data manager 160 receives the retrieved personal data and provides it to data officer 150, who in turn provides the personal data to data subject 110 in an appropriate format (e.g., JSON, XML, PDF) via appropriate channels.

Figure 2:
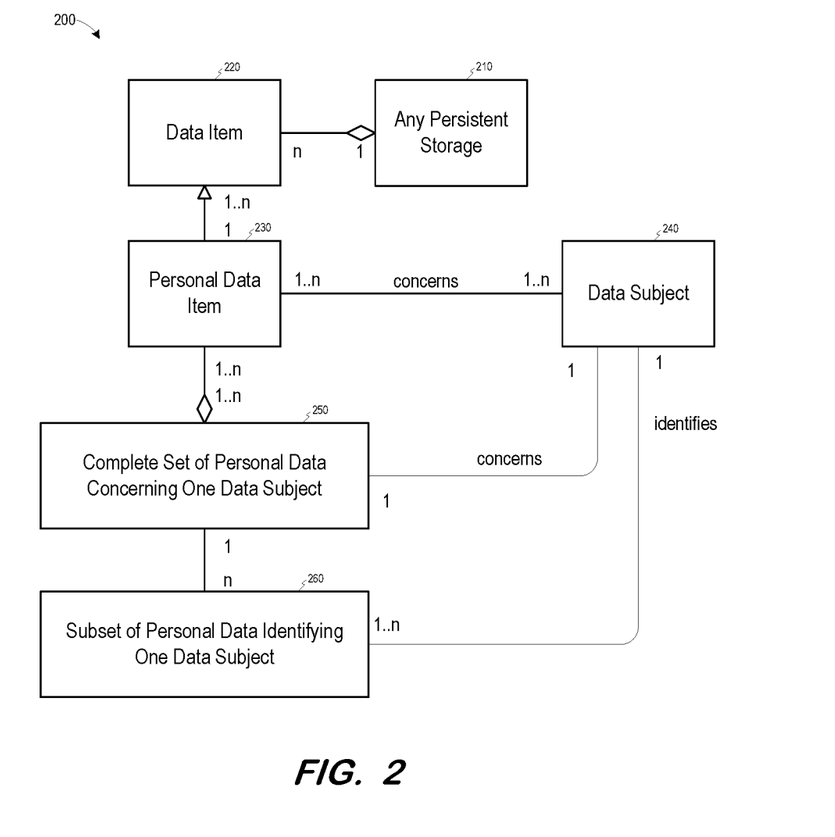
FIG. 2 is a Unified Modeling Language diagram of data within a persistent storage according to some embodiments.

FIG. 2 illustrates Unified Modeling Language diagram 200 of application data for explaining the concept of search parameter combinations according to some embodiments. As illustrated, persistent storage 210 of an application system stores data items 220. Persistent storage 210 may consist of any relational database, document database, file system, blockchain, graph database, etc.

Persistent storage 210 contains many data items 220 and may be equivalent to data 124. If a data item 220 concerns a natural person or other legal person, the data item is considered a personal data item 230. The natural person with which the personal data item 230 is concerned is referred to as data subject 240. As mentioned above, a personal data item 230 may concern multiple data subjects 240, and multiple personal data items may concern one data subject 240, with subsets of the data items consisting of personal data items. Each data subject 240 is associated with at least one personal data item 230, and a data item 220 must concern at least one data subject to be considered a personal data item 230.

Various subsets 250 of personal data 230 form a complete set of personal data concerning a given data subject. Generally, each subset 250 includes the data to be acquired by some embodiments for a given data subject. As described above, personal data is just one example of data which may be acquired according to some embodiments.

A subset 260 of each of various subsets 250 is identifying of the given data subject of the subset 250. The subsets 260 for a given application system may consist of any combination of parameters that can be used to uniquely identify a corresponding data subject (e.g., address and date of birth, order number, shoe size and last name and favorite color).

Embodiments may therefore facilitate querying of subsets 260 of an application system to identify a given data subject 240 within that application system. The identity of the data subject 240 may then be used to acquire all personal data 250 within the application system concerning that data subject. An application system may model the identity of data subject 240 using a customer no., etc., but such an identifier is not required.

As noted in diagram 200, more than one identifying subset 260 may exist for each complete set of personal data 250 within an application system. These identifying subsets 260 depend on values of all data items 220 stored in persistent storage 210 and therefore cannot be completely known at design time. However, at design time, domain experts may define typical and useful subsets 260 that should be sufficient to identify a full set of personal data items 250 concerning the data subject. Again, more than one typical and useful subset 260 may be defined for this purpose in the application system. The following are non-exhaustive examples of subsets 260 according to some embodiments, listed as combinations of search parameters: {first name, last name, email address}; {first name, last name, phone number}; {customer no.}; {first name, last name, any invoice number}, {first name, last name, day of birth, place of birth}, {Order-Number}, and {Event-participated, Seat}.

It should be understood that an application system need not store the civil identity of a data subject if not required for its functionality. For example, an application system used to send marketing emails to anonymous email subscribers might not require the civil identity of the subscribers. Subset 260 of such an application system may include only the email address and the first name of each data subject 240. An application used to send text messages might only store the phone number of each data subject 240, in which case subset 260 may include only the phone number.

Figure 3:
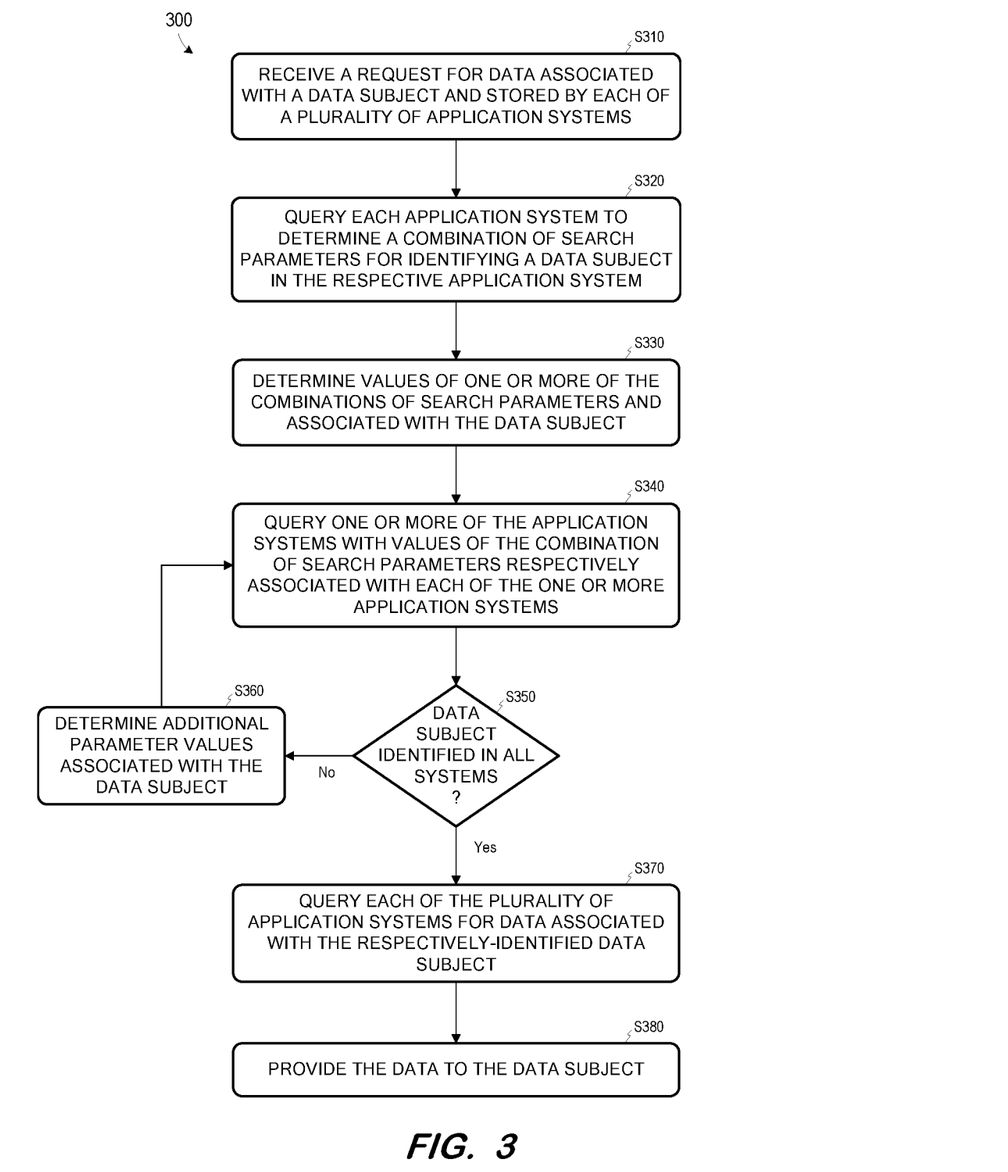
FIG. 3 is a flow diagram of a process to fulfill a request for data received from a data subject according to some embodiments.

FIG. 3 illustrates process 300 to retrieve personal data concerning a data subject from an application system according to some embodiments.

Process 300 and the other processes described herein may be performed using any suitable combination of hardware and software. Software program code embodying these processes may be stored by any non-transitory tangible medium, including but not limited to fixed disks, volatile or non-volatile random access memory, DVDs, and Flash drives, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Initially, at S310, a request for data associated with a data subject and stored by each of a plurality of application systems is received. The request may be received from the data subject by a data officer/department responsible for handling such requests with respect to each of the plurality of application systems. As described above, a single company may operate each of the plurality of application systems and the company may dictate the form of requests submitted by data subjects and the manner of submission. The form and manner may be developed so as to comply with applicable data privacy laws and regulations. The data officer may verify identifying information provided by the data subject along with the request to ensure the data subject is authorized to receive the requested data (e.g., is in fact the data subject for whom personal data is being requested).

Next, at S320, each of the plurality of application systems is queried (e.g., by data manager 160) to determine a at least one combination of search parameters that can be used to identify a data subject within each respective application system. As noted above, the combinations of search parameters may differ among each application system, and some search parameters may be common among two or more combinations of search parameters. Embodiments may provide a uniform interface for querying each application system for the combinations of search parameters, as described below with respect to FIG. 4.

Values associated with the data subject for each parameter of at least one of the combinations of search parameters are determined at S330. The values may be determined by requesting additional information (i.e., the values) from the requesting data subject, if needed. One or more of the application systems is queried at S340 using values of a combination of search parameters associated with the one or more queried application systems. That is, combinations of search parameters are identified for which values of each search parameter are known, and the application systems which are associated with these combinations of search parameters are queried using the respective values.

At S350, it is determined whether the data subject has been identified within each of the plurality of application systems. If not, flow proceeds to S360 to determine additional parameter values associated with the data subject, which are then used at S340 as described above to query one or more of the application systems in which the data subject has not yet been identified. Accordingly, as described above, the results received from one application system in response to a query at S340 may be used to populate a combination of search parameter values associated with a second application system and to query the second application system during a subsequent iteration of S340 based thereon.

S360 may also include additional requests for data from the data subject to further confirm the identity thereof and/or to determine which of multiple records returned by an application system is associated with the data subject and which concern other data subjects.

Flow may therefore cycle through S340, S350 and S360 several times until it is determined at S350 that the data subject has been identified within each of the plurality of application systems. Next, at S370, each of the plurality of application systems is queried for all stored personal data associated with the identified data subject. The returned data is then provided to the data subject at S380 in any suitable format.

Figure 4:
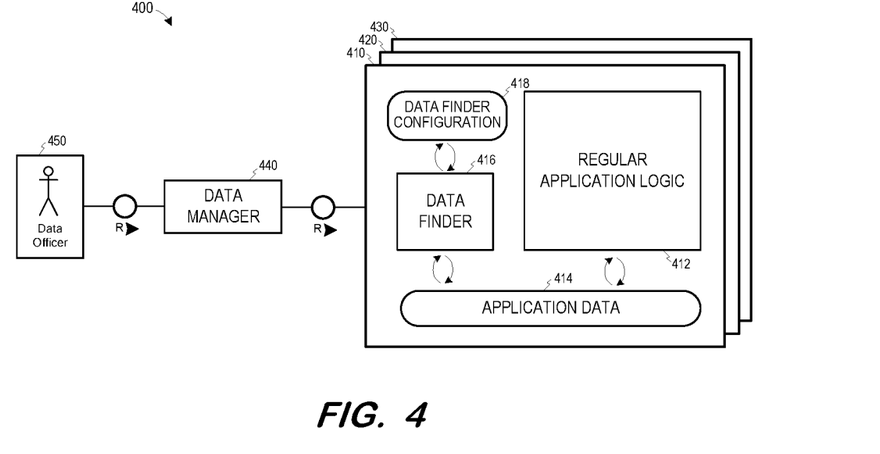
FIG. 4 is a block diagram of a system architecture according to some embodiments.

FIG. 4 is a block diagram of system 400 according to some embodiments. System 400 may comprise an implementation of corresponding elements of system 100 of FIG. 1 and operate as described above, but embodiments are not limited thereto.

Each of application systems 410, 420 and 430 includes respective application logic 412 which is executable in conjunction with stored application data 414 to provide desired functionality. According to some embodiments, each application system 410, 420 and 430 includes data finder component 416 that provides a callback API for data manager 440. An event-based or other communication mechanism may be used. Data finder 416 is provided access to stored application data 414 in order to read personal data therefrom.

Each application system 410, 420 and 430 also includes respective data finder configuration 418. Configuration 418 defines the one or more combinations of search parameters which are provided to data manager 440 by a particular application system on request as described above. The one or more combinations of search parameters defined in data finder configuration 418 may differ between various application systems.

Data finder configuration 418 of an application system may be customer-specific and/or editable by an administrator to change the defined combinations of search parameters. For example, one customer of application system 410 might consider combinations of search parameters as identifying, while another customer might consider one of these combinations as not identifying and delete the one combination from its associated data finder configuration 418. In some embodiments the combinations of parameters are determined by data finder 416 and/or application logic 412 at runtime. For example, if it is determined that all combinations of first and last name values stored in application data 414 are unique, data finder 416 may provide the parameter combination {first name, last name} to data manager 440 in response to a request at S310. If the stored first and last name value combinations become not unique during operation of application system 410, then data finder 416 would not return the parameter combination {first name, last name} in response to a next request from data manager 440 at S310. Rather, for example, data finder 416 might return {first name, last name, city} depending on stored data 414 and data finder configuration 418.

Figure 5:
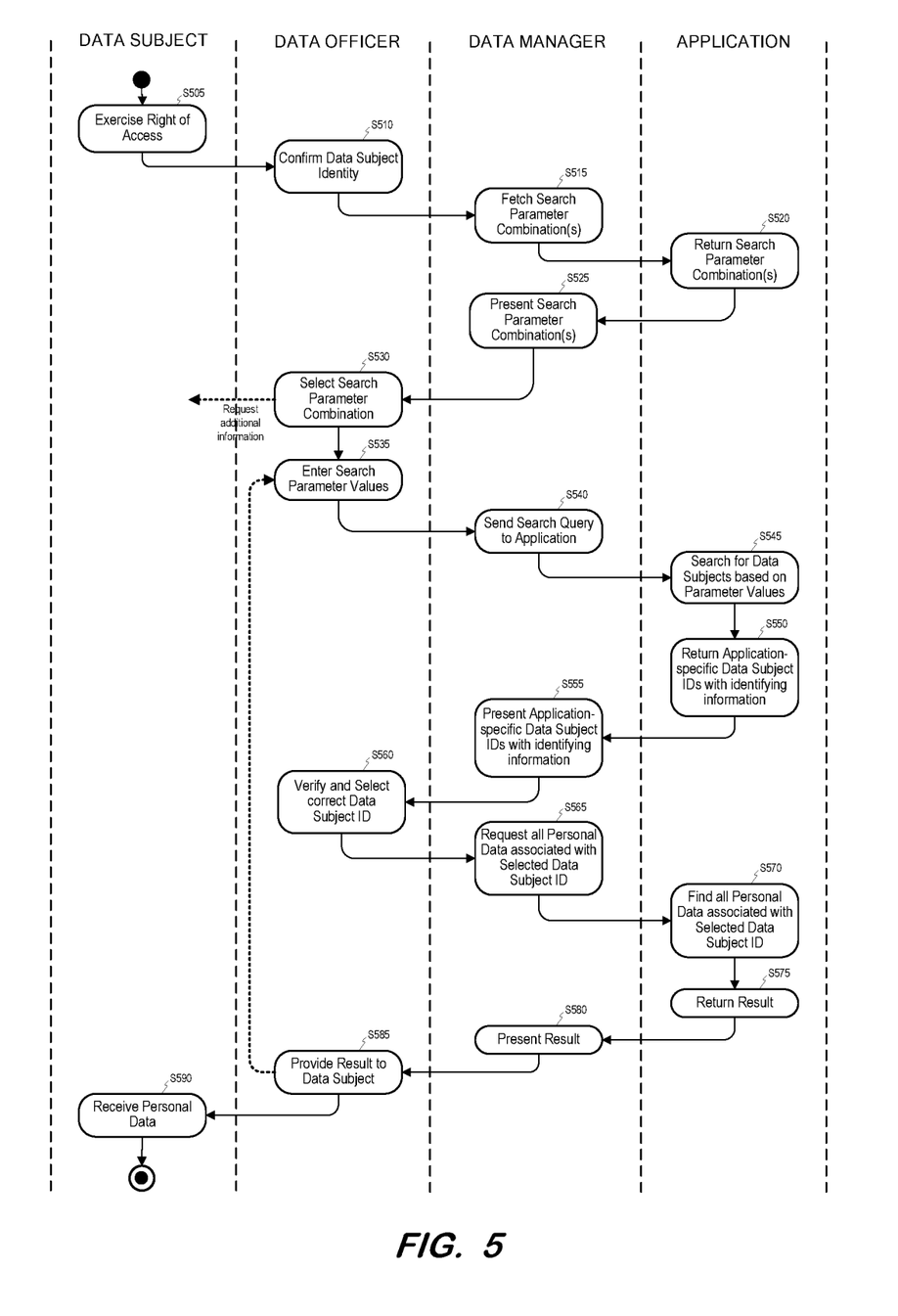
FIG. 5 is a diagram of a process to fulfill a request for data received from a data subject according to some embodiments.

FIG. 5 is a diagram illustrating steps performed by various components according to some embodiments. According to some implementations, a data subject exercises a right of access to personal data at S505 and a data officer confirms the data subject's identity at S510. Confirmation of the identity may comprise an electronic authorization method, including but not limited to username/password and multi-factor authentication, or transmitting a copy of a passport.

Figure 6:
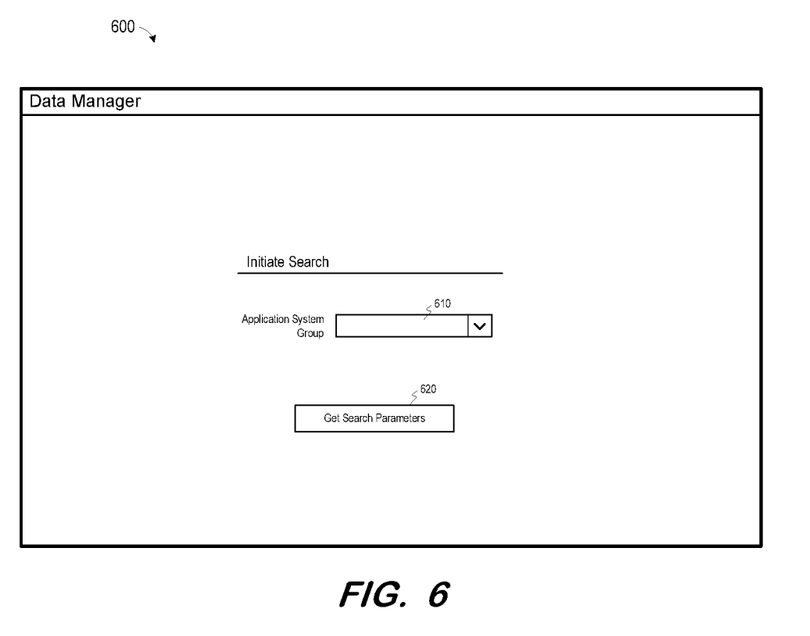
FIG. 6 is a view of a user interface to initiate a search for personal data associated with a data subject according to some embodiments.

The data officer communicates with a data manager to initiate acquisition of personal data associated with the data subject. FIG. 6 illustrates user interface 600 of a data manager service according to some embodiments. User interface 600 may be provided by the data manager and accessed via a Web browser executing on a computing system operated by the data officer. User interface 600 includes drop-down menu 610 to allow selection of one of several groups of one or more application systems to which the data manager has access. For example, depending on the relationship between the data subject and the data-storing entity, only a certain subset of application systems operated by the entity might be suitable for querying for personal data of the data subject.

Once a group of application systems is specified in drop-down menu 610, the data officer may select control 620 to instruct the data manager to acquire the above-described combinations of search parameters for each of the application systems of the selected group. Accordingly, at S515, the data manager fetches one or more combinations of search parameters from the one or more application systems. Fetching the combinations may comprise issuing a request to a data finder component 416 of each application system, which determines the one or more search parameter combinations for its application system based on its associated data finder configuration 418 and returns the one or more search parameter combinations to the data manager at S520. The diagram of FIG. 5 illustrates operation of a single application system for clarity, but it should be understood that the illustrated operation may be performed contemporaneously by two or more application systems.

Figure 7:
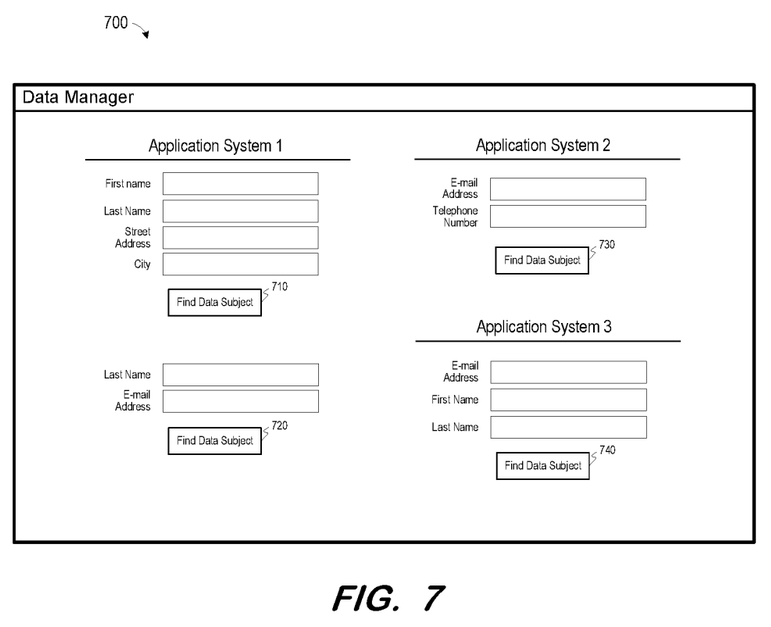
FIG. 7 is a view of a user interface presenting combinations of search parameters for identifying a data subject in respective application systems according to some embodiments.

The data manager presents the search parameter combinations to the data officer at S525. FIG. 7 illustrates user interface 700 provided by the data manager to the data officer at S525 according to some embodiments. As shown, user interface 700 presents one or more combinations of search parameters returned by each of three application systems at S520. In particular, application system 1 is associated with two combinations of search parameters while application systems 2 and 3 are each associated with a single combination of search parameters. Some search parameters of one presented combination are identical to search parameters of another presented combination. Embodiments are not limited to three application systems.

The data officer selects at S530 at least one presented combination for which parameter values will be determined. The data officer may possess values of these parameter based on the initial request to exercise the right of access and/or may request one or more values from the data subject. The search parameter values are entered into interface 700 at S535 and, in response to selection of associated control 710 through 740, are used to query the corresponding application system for a corresponding application-specific data subject ID (e.g., customers represented by a customer no., employees represented by a personnel no., email recipients represented by an email addresses).

Figure 8:
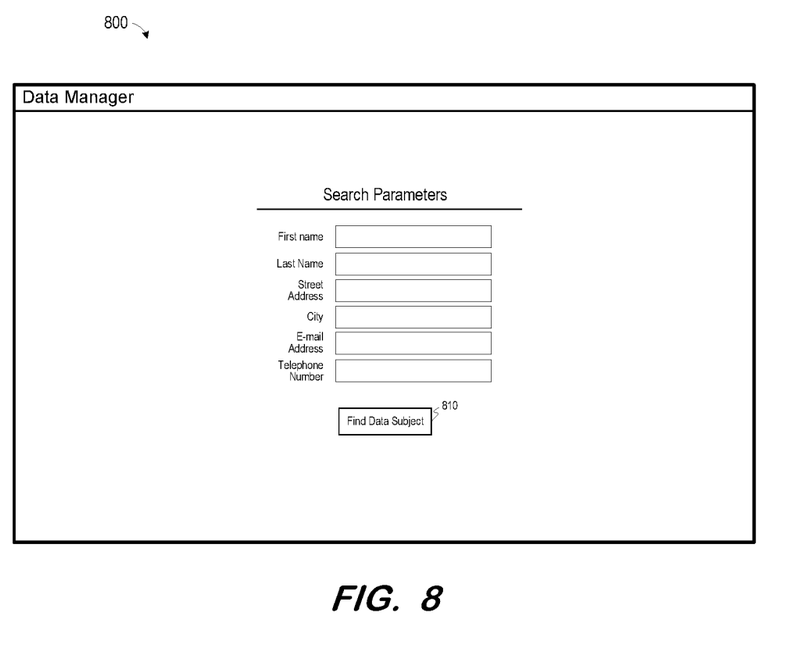
FIG. 8 is a view of a user interface presenting search parameters for identifying a data subject in one or more application systems according to some embodiments.

FIG. 8 illustrates an alternative user interface for presenting and populating combinations of search parameters received from the application systems. User interface 800 presents the union of all search parameters of all search parameter combinations received from the one or more application systems. According to some embodiments, a data officer may populate the fields of user interface 800 with all known parameter values at S535, and the data manager then operates to identify combinations of search parameters corresponding to one or more application systems from the populated fields. The values of each identified combination are then used at S540 to query a corresponding application system.

Each application system which receives a query searches its data store at S545 for application-specific data subject IDs based on the parameter values of the received query. Any located application-specific data subject IDs are returned to the data manager at S550. More than one application-specific data subject ID representing more than one data subject may be returned at S550.

Also returned at S550 may be identifying information about the data subject(s) corresponding to the identified ID(s). For example, a customer no. might be returned along with a customer name, customer day of birth and customer address. An application system may provide further information indicating a likelihood (e.g., a percentage chance) that a returned application-specific data subject ID actually concerns the given data subject.

Figure 9:
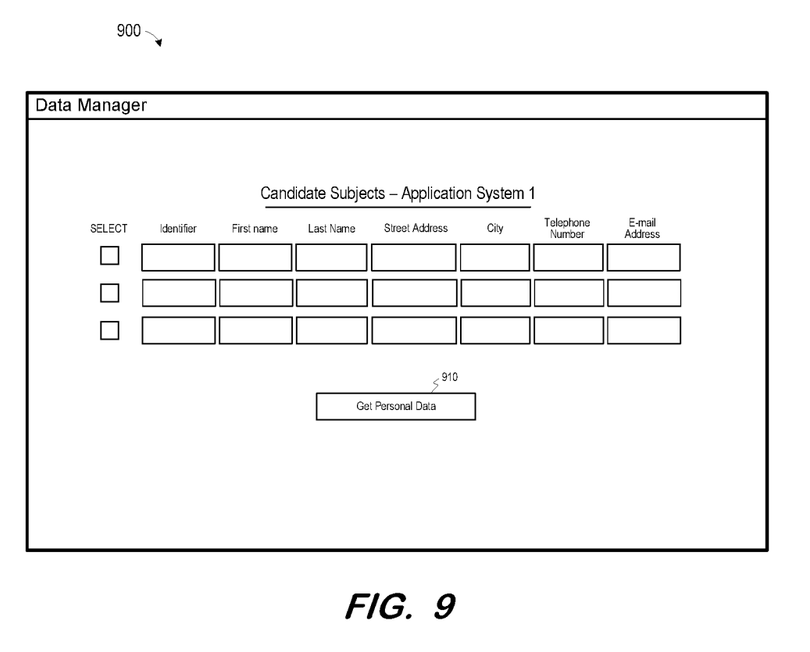
FIG. 9 is a view of a user interface to present candidate data subjects in response to an initial search of an application system according to some embodiments.

The returned application-specific data subject IDs and associated identifying information are presented to the data officer at S555. FIG. 9 is a view of user interface 900 provided by the data manager to present three returned sets of application-specific data subject IDs and associated identifying information according to some embodiments. In the illustrated example, the application-specific data subject IDs and identifying information are returned from one of the application systems queried at S540. Each of the application-specific data subject IDs is associated with a different data subject.

In some embodiments, some of the identifying information may be partially masked in order to protect personal data concerning other data subjects represented in the returned data. For example, if the identifying information includes international bank account numbers, only certain digits might be presented to the data officer.

At S560, the data officer uses the identifying information associated with the application-specific data subject IDs to verify and select the correct data subject ID corresponding to the current data subject. S560 may include requesting additional information (e.g., address data) from the data subject. According to the present example of FIG. 9, the data officer selects the SELECT checkbox adjacent to the information of the correct data subject and selects control 910 to instruct the data manager to retrieve personal data of the data subject from the corresponding application system. The data officer may perform S560 for each of the application systems from which application-specific data subject IDs and associated identifying information was returned at S550.

The data manager requests personal data of the data subject using the selected application-specific data subject ID at S565. In response, the application system finds all stored personal data associated with the application-specific data subject ID at S570 and returns the personal data to the data manager at S575. Mechanisms for storing and retrieving the personal data are within the province of the application systems themselves, which may employ indexes, in-memory storage and any other data storage and retrieval systems that are or become known.

The data manager presents the result to the data officer at S580, who in turn provides the result to the data subject at S585. S580 or S585 may further include processing of the returned data using existing mechanisms (e.g., conversion to PDF, conversion to XML) prior to providing the data to the data subject.

As noted above, the FIG. 5 sequence may be performed in parallel with respect to several application systems, resulting in the retrieval of personal data concerning the data subject from several application systems. As also noted and depicted by a dotted arrow in FIG. 5, results provided from one application system may be used, with or without additional information provided by the data subject, to provide data manager with values of search parameter combinations associated with another application system. Portions of the FIG. 5 sequence may therefore be performed iteratively until personal data concerning the data subject is retrieved from all application systems.

In order to facilitate such iterations, the data manager might store prior-used parameter values for a data subject. For example, if the data officer has previously entered a certain value for the search parameter "name" for a given application system and data subject, the data manager could suggest this value to the data officer when presenting a combination of search parameters of another application system for the same data subject. These values may be deleted immediately after completion of the search process for the data subject to comply with legal requirements.

According to some implementations, two or more application systems may be integrated with a central service providing identification of data subjects via a central ID. Once the central business partner ID for a given data subject is determined within a first application system, the data manager may use the same central business partner ID to request personal data of the data subject from each other application system which is integrated with the central service.

In some embodiments, the data subject may authenticate directly with an application system to retrieve personal data therefrom. The authentication process results in the application system identifying an application-specific data subject ID corresponding to the data subject. The application system may then use this application-specific data subject ID to identify personal data concerning the data subject.

To promote data privacy of data subjects other than the requesting data subject, some embodiments limit the number of sets of application-specific data subject IDs and identifying information presented to the data officer at S555. For example, if too many (e.g., more than 20) data subjects satisfy the provided search parameter values, an application system (or the data manager) may return an error such as "Your query was too generic". The maximum number of presented sets may be configurable by an administrator.

Embodiments may implement fuzzy search queries in order reduce the dependence on the correct spelling of names, etc. For example, name values entered by the data officer may be fuzzily searched to determine application-specific data subject IDs. The data manager may include a fuzzy search component for handling domain independent cases, e.g., umlauts ("Müller"<->"Mueller"), while the personal data finder within a given application system might provide fuzzy search for domain specific values. The data manager or an application system might access a third-party fuzzy search provider using proprietary fuzzy search dictionaries/libraries.

Figure 10:
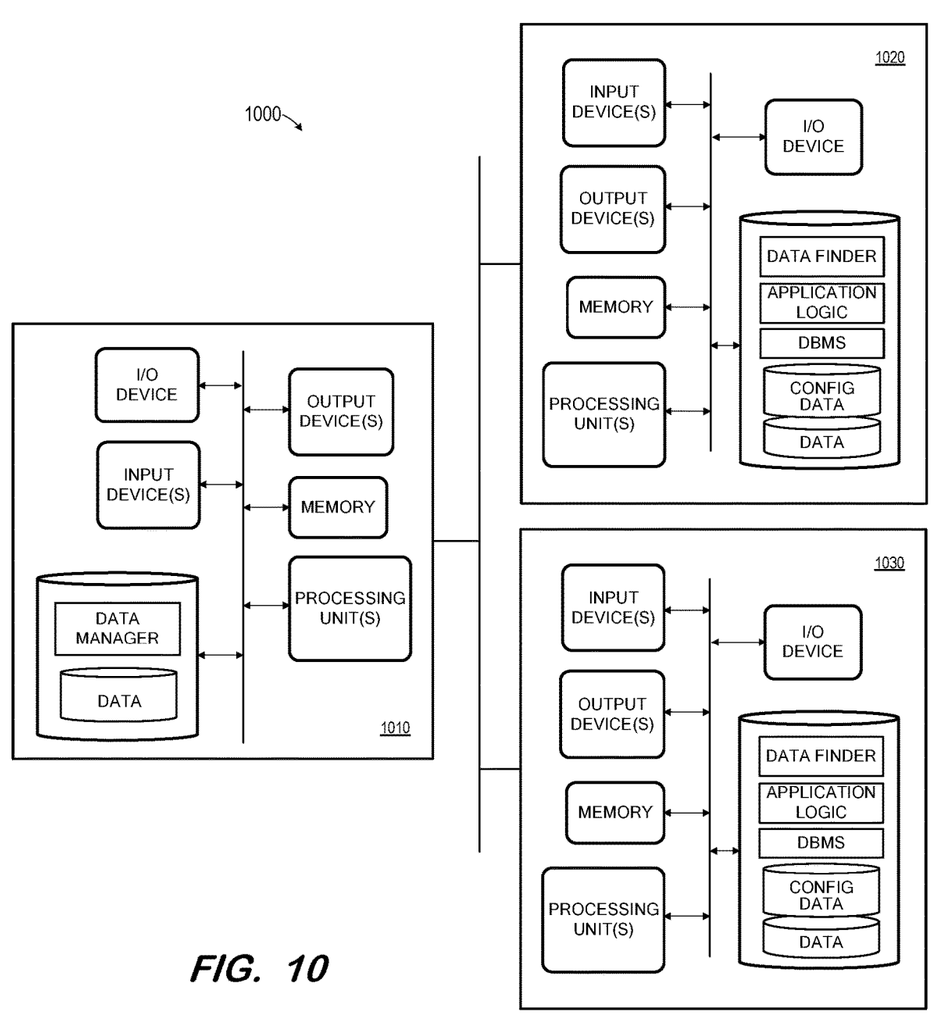
FIG. 10 is a diagram of computing devices comprising a system architecture according to some embodiments.

FIG. 10 is a block diagram of system 1000 according to some embodiments. System 1000 includes data manager system 1010, which may comprise an implementation of data manager 160 or data manager 440. As described above, data manager system 1010 may comprise a cloud-based system accessible via a Web browser of a client device operated by a data officer. Data manager system 1010 may therefore include processor-executable program code of a data manager as described above and a Web server.

Each of application systems 1020 and 1030 may comprise a cloud-based application system implementing any one or more software applications as described herein. Application systems 1020 and 1030 include processor-executable program code of a data finder and application logic as described herein, and configuration data to enable operation in conjunction with data manager system 1010 as described herein.

Each of systems 1010, 1020 and 1030 may comprise a general-purpose computing apparatus and may execute program code using processing unit(s) to perform any of the functions described herein. Each of systems 1010, 1020 and 1030 may include other unshown elements according to some embodiments.

All data storage mentioned herein may be provided via combinations of magnetic storage devices (e.g., hard disk drives and flash memory), optical storage devices, Read Only Memory (ROM) devices, etc., while volatile memory may comprise Random Access Memory (RAM), Storage Class Memory (SCM) or any other fast-access memory.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a memory storing processor-executable program code;
   a processing unit to execute the processor-executable program code to cause the system to:
   request, from a first application system, a first one or more combinations of search parameters for identifying a data subject identifier of the first application system;
   transmit a first query to the first application system including values of search parameters of a first one of the first one or more combinations of search parameters, the values associated with a first data subject;
   receive a first data subject identifier of the first application system in response to the first query;
   transmit a second query to the first application system including the first data subject identifier;
   receive data of the first application system associated with the first data subject identifier in response to the second query;
   request, from a second application system, a second one or more combinations of search parameters for identifying a data subject identifier of the second application system;
   transmit a third query to the second application system including values of search parameters of a first one of the second one or more combinations of search parameters, the values associated with the first data subject and the second one or more combinations of search parameters being different from the first one or more combinations of search parameters;
   receive a second data subject identifier of the second application system in response to the third query;
   transmit a fourth query to the second application system including the second data subject identifier; and
   receive data of the second application system associated with the first data subject identifier in response to the fourth query.

2. A system according to claim 1, wherein the data is personal data of the first data subject.

3. A system according to claim 2, wherein at least one of the values of search parameters of the first one of the second one or more combinations of search parameters is determined based on the received data of the first application system associated with the first data subject identifier.

4. A system according to claim 3, wherein receipt of the first data subject identifier of the first application system comprises receipt of a plurality of data subject identifiers of the first application system, each of the plurality of data subject identifiers associated with respective identifying information, the processing unit to execute the processor-executable program code to cause the system to:
   determine that the first data subject identifier corresponds to the first data subject based on the identifying information associated with the first data subject identifier.

5. A system according to claim 4, wherein determination that the first data subject identifier corresponds to the first data subject comprises requesting of information from the first data subject.

6. A system according to claim 1, wherein receipt of the first data subject identifier of the first application system comprises receipt of a plurality of data subject identifiers of the first application system, each of the plurality of data subject identifiers associated with respective identifying information, the processing unit to execute the processor-executable program code to cause the system to:
   determine that the first data subject identifier corresponds to the first data subject based on the identifying information associated with the first data subject identifier.

7. A system according to claim 6, wherein determination that the first data subject identifier corresponds to the first data subject comprises requesting of information from the first data subject.

8. A computer-implemented method comprising:
   receiving a request for data associated with a first data subject;
   in response to the request, requesting, from a first application system, a first one or more combinations of search parameters for identifying a data subject identifier of the first application system;
   receiving, from the first application system, the first one or more combinations of search parameters for identifying a data subject identifier of the first application system;
   determining values of search parameters of a first one of the first one or more combinations of search parameters, the values associated with the first data subject;
   transmitting a first query to the first application system including the values of search parameters of the first one of the first one or more combinations of search parameters;
   receiving a first data subject identifier of the first application system in response to the first query;
   transmitting a second query to the first application system including the first data subject identifier;
   receiving data of the first application system associated with the first data subject identifier in response to the second query;
   requesting, from a second application system, a second one or more combinations of search parameters for identifying a data subject identifier of the second application system;
   transmitting a third query to the second application system including values of search parameters of a first one of the second one or more combinations of search parameters, the values associated with the first data subject, and the second one or more combinations of search parameters being different from the first one or more combinations of search parameters;

receiving a second data subject identifier of the second application system in response to the third query;

transmitting a fourth query to the second application system including the second data subject identifier; and receiving data of the second application system associated with the first data subject identifier in response to the fourth query.

9. A method according to claim 8, wherein the data is personal data of the first data subject.

10. A method according to claim 9, wherein at least one of the values of search parameters of the first one of the second one or more combinations of search parameters is determined based on the received data of the first application system associated with the first data subject identifier.

11. A method according to claim 10, wherein receiving the first data subject identifier of the first application system comprises receiving a plurality of data subject identifiers of the first application system, each of the plurality of data subject identifiers associated with respective identifying information, the method further comprising:

determining that the first data subject identifier corresponds to the first data subject based on the identifying information associated with the first data subject identifier.

12. A method according to claim 11, wherein determining that the first data subject identifier corresponds to the first data subject comprises requesting information from the first data subject.

13. A method according to claim 8, wherein receiving the first data subject identifier of the first application system comprises receiving a plurality of data subject identifiers of the first application system, each of the plurality of data subject identifiers associated with respective identifying information, the method further comprising:

determining that the first data subject identifier corresponds to the first data subject based on the identifying information associated with the first data subject identifier.

14. A system comprising:

a first application system to execute first application logic and comprising:
  a first data store;
  a first memory storing first processor-executable program code; and
  a first processing unit to execute the first processor-executable program code;

a second application system to execute second application logic and comprising:
  a second data store;
  a second memory storing first processor-executable program code; and
  a second processing unit to execute the first processor-executable program code; and a data manager system comprising:
  a third memory storing third processor-executable program code; and
  a third processing unit to execute the third processor-executable program code to cause the data manager system to:
    request, from the first application system, a first one or more combinations of search parameters for identifying a data subject identifier stored in the data store of the first application system;
    transmit a first query to the first application system including values of search parameters of a first one of the first one or more combinations of search parameters, the values associated with a first data subject;
    receive a first data subject identifier of the first application system in response to the first query;
    transmit a second query to the first application system including the first data subject identifier;
    receive data of the first application system associated with the first data subject identifier in the first data store in response to the second query;
    request, from the second application system, a second one or more combinations of search parameters for identifying a data subject identifier of the second application system;
    transmit a third query to the second application system including values of search parameters of a first one of the second one or more combinations of search parameters, the values associated with the first data subject and the second one or more combinations of search parameters being different from the first one or more combinations of search parameters;
    receive a second data subject identifier of the second application system in response to the third query;
    transmit a fourth query to the second application system including the second data subject identifier; and
    receive data of the second application system associated with the first data subject identifier in response to the fourth query.

15. A system according to claim 14, wherein the data is personal data of the first data subject.

16. A system according to claim 15, wherein at least one of the values of search parameters of the first one of the second one or more combinations of search parameters is determined based on the received data of the first application system associated with the first data subject identifier.

17. A system according to claim 14, the first application system to determine the first one or more combinations of search parameters based on data stored in the first data store.

* * * * *